Oct. 29, 1968 C. F. MILLER 3,407,985

HEAT APPLICATOR WORK HOLDER

Filed Oct. 17, 1966 2 Sheets-Sheet 1

INVENTOR
CHARLES FREDRICK MILLER

BY Bair Freeman & Molinare
ATTORNEYS

HEAT APPLICATOR WORK HOLDER

Filed Oct. 17, 1966 2 Sheets-Sheet 2

INVENTOR
CHARLES FREDRICK MILLER

BY Bair, Freeman & Molinare
ATTORNEYS

United States Patent Office 3,407,985
Patented Oct. 29, 1968

3,407,985

HEAT APPLICATOR WORK HOLDER

Charles Fredrick Miller, Anaheim, Calif., assignor to Basic Products Corporation, a corporation of Wisconsin Filed Oct. 17, 1966, Ser. No. 588,273
10 Claims. (Cl. 228—51)

ABSTRACT OF THE DISCLOSURE

A semiconductor work piece holder mounted on a stationary platform. The work piece holder includes a vacuum tube to hold the work piece in position on the holder. The holder is rotatably mounted in a carbon block which is heated by electric resistance heaters mounted in openings in the carbon block. Inert gas may be directed over the work piece station to prevent oxidation or corrosion of the work piece during operation thereon. A work piece is rotatably mounted adjacent to the block and the work piece station and is drivingly connected to the work piece station for simultaneous rotation therewith.

This invention relates to a work station for wire and die bonding apparatus, and more particularly to a work station construction adapted to receive and properly support different types of semiconductor device parts during either wire or die bonding operations.

In the manufacture of transistors and similar semiconductor devices, it has been the usual practice to bond a wafer or die of semiconductor material to a partially completed header or the like in a die bonding machine and thereafter to bond connecting wires to conduct the strips on the die and to terminal posts in a separate wire bonding machine. Many such machines are highly specialized and are capable of use only with certain types of devices to perform certain operations in connection therewith.

There is a demand for a machine of greater flexibility, even though of less productive capacity, which is capable of use with a number of different types of semiconductor devices for performing either die or wire bonding operations thereon. One of the problems in connection with such machines is the provision of a work station to support and to properly position and orient a header or the like for different types of operations.

It is one of the objects of the present invention to provide a work station which is capable of receiving and supporting various types of headers or the like in proper position and orientation for the performance of either die or wire bonding operations thereon.

Another object is to provide a work station in which the header or the like is supported on a rotatable head which rotates in a heated block by means of which the head is in turn heated.

According to a feature of the invention, the block is secured to a supporting plate and is enclosed in an insulation casing around which a radiation shield is placed with the block being separated from the supporting plate by a heat transfer plate so that parts of the apparatus likely to be touched by an operator will remain relatively cool.

Still another object is to provide a work station in which the rotatable head and supporting means thereon are formed with a passage connected to a source of vacuum and terminating in an opening in the top of the supporting means to hold a header properly in place thereon.

Yet another object is to provide a work station in which an inert gas is conducted through the block or insulating casing around the block to a horizontally directed opening above and at one side of the supporting means to direct gas over the work area.

A further object is to provide a work station in which a dice cup is rotatably mounted adjacent to the block and is drivably connected to the head for simultaneous rotation therewith.

The above and other objects and features of the invention will be more readily apparent from the following description when read in connection with the accompanying drawing in which.

Figure 1:
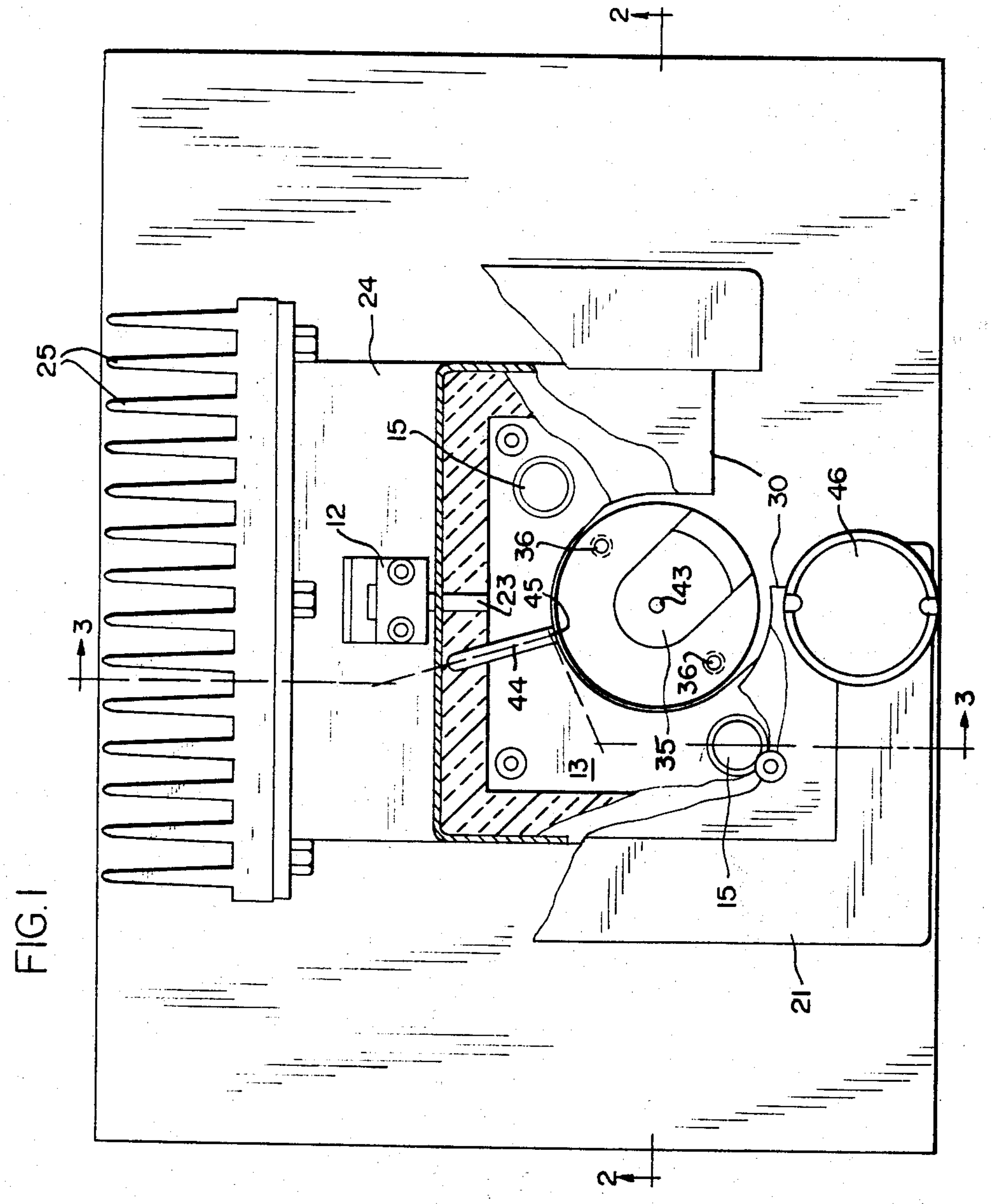
FIGURE 1 is a top plan view of a work station embodying the invention with parts broken away and in section.

The work station as shown, comprises a supporting plate 10 which may be formed conveniently of steel or similar metal and which is movably supported on legs 11 for shifting horizontally. The supporting plate is adapted to be mounted in a die or wire bonding or combination machine adjacent to the desired work area so that parts carried by the work station on the supporting plate can be properly positioned for the performance of the desired operations thereon.

The supporting plate has secured thereto several vertically extending posts or columns 12. As seen from the sections in FIGURES 2 and 3, three such columns or posts are provided in triangularly spaced relationship. The posts or columns 12 are adapted to support a heater block assembly. As shown, this assembly comprises a block 13 which may conveniently be formed of carbon. The heater block is formed with a central vertical cylindrical opening therethrough which is defined by inwardly extending circular fins 14 which may serve both partially as bearings and as heat trasfer fins to assist in transfer of heat to the rotary head as described more fully hereinafter.

At spaced points around the central opening, the heater block is provided with vertically extending bores to receive heater elements 15 which are preferably electrical resistance elements and which are connected to a suitable source of power through wires 16. The heater block is enclosed in an insulating casing defined by an inverted cup-shaped metallic shell 17 lined with heat insulating material 18 around the block. The shell and insulating material are cut away at the top to leave an opening 19, registering with the central opening in the block 13. A radiation shield 21 which may be formed of thin sheet metal surrounds the casing 17 in spaced relation thereto and may be supported by connecting it through screws 22 to the uprights or posts 12. The radiation shield is also formed in its top with an opening registering with the central opening in the block 13.

The heater block assembly is supported from the posts 12 by means of pins 23 carried by the posts and projecting horizontally into openings in the heater block assembly. In addition to the insulation transfer of heat from the heater block assembly to the mounting plate is limited by a heat transfer plate 24 underlying the heater block and casing. As shown, the heat transfer plate is in spaced relation to the supporting plate to minimize transfer of heat therebetween. The heat transfer plate further projects one side of the heater block assembly and carries a series of fins 25 which will dissipate heat from the plate to the atmosphere by radiation and conduction.

A head 26 which is vertically elongated and of circular section fits within the opening in the heater block. As shown, the head is formed with outwardly projecting circular fins 27 which fit between fins 14 on the block to assist in rotatably supporting the head and to facilitate heat transfer from the block to the head. In order that the head may be assembled within the block, the block is preferably cut away at one side as shown at 30 in FIGURE 1, with grooves and fins in the block extending in parallel tangential lines to the open portion thereof. By this means the head can be inserted from one side of the block before the block is enclosed in the insulating casing.

At its lower end, the head 26 is connected to a rotatable shaft 28 supported for rotation in bearings 29 carried by the supporting plate 10. Below the bearing 29 the shaft is connected through a spherical joint 31 with an arm 32 which may be connected to or be a part of a micromanipulator mechanism by means of which the entire work station assembly can be shifted horizontally through limited distances. Below the bearing 31, the shaft carries a pulley or sheave 33 over which a driving belt is trained to turn the shaft as desired. Preferably, the belt leads to a hand-controlled knob through which limited and accurately controlled rotation may be imparted to the shaft properly to orient work pieces carried by the work station. Work pieces such as partially completed headers are adapted to be mounted on the upper end of the head by means of a work supporting means 34 which is detachably connected to the upper surface of the head. As best seen in FIGURE 1, the head may be provided with a slot 35 opening at one side thereof, into which a header may be inserted. It will be apparent that supporting means of different configurations can be provided and can be selectively mounted on the head to accommodate work pieces or headers of different sizes and configurations. This can easily be done by removing an existing supporting means as for example, by releasing two screws 36 which hold it in place on the head and substituting another supporting means of different size or configuration.

Figure 2:
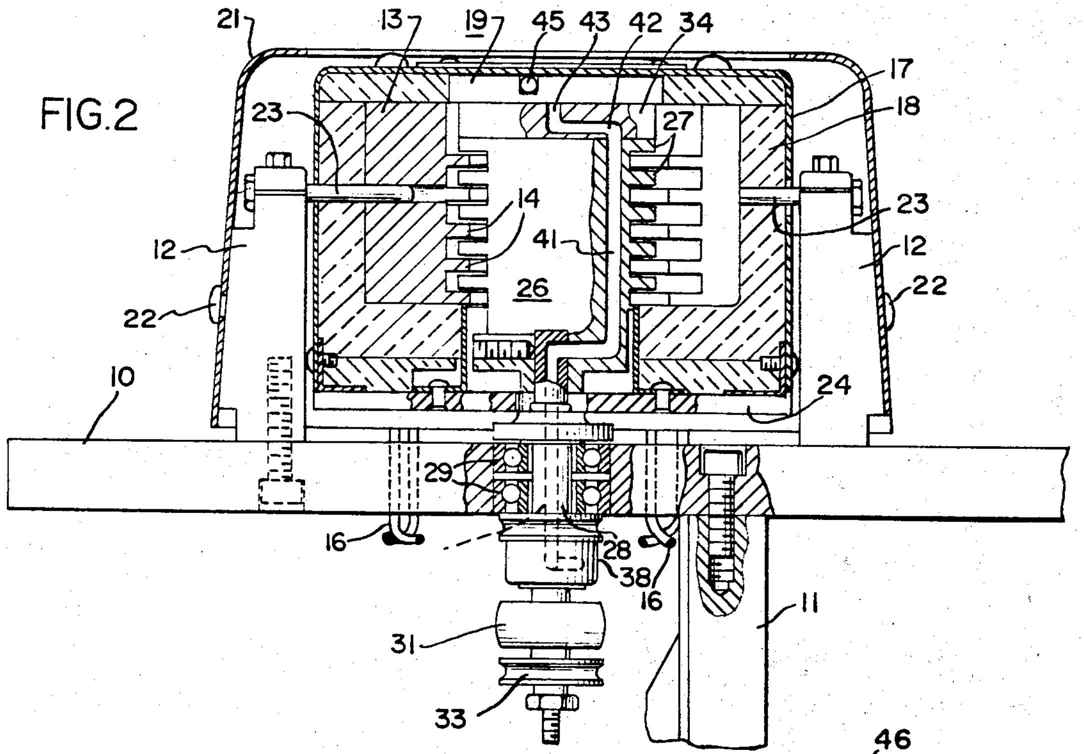
FIGURE 2 is a section on the line 2—2 of FIGURE 1.

In order to assist in holding a work piece on the supporting means, the shaft 28 is formed in its upper portion with a central bore 37 extending to the upper end of the shaft. At the lower end, the bore 37 is connected through a lateral bore to a collar 38 surrounding the shaft. As seen in FIGURE 2, the collar 38 is formed with an internal annular groove registering with the lateral bore in the shaft and sealed against the shaft at opposite sides of the groove. The collar 38 may be connected through a fitting 39 and suitable hose connections to a source of vacuum.

The head is formed with a similar bore 41 communicating at the lower end of the head with the bore 37 and at the upper end of the head with a similar bore 42 in the supporting means which terminates in a port 43 centrally of the supporting means and at the upper end thereof. When a header or similar semiconductor part is placed in the supporting means, vacuum to which it is exposed through the port 43 will tend to draw the header tightly against the supporting means and to hold it securely in place during bonding operations thereon.

Figure 3:
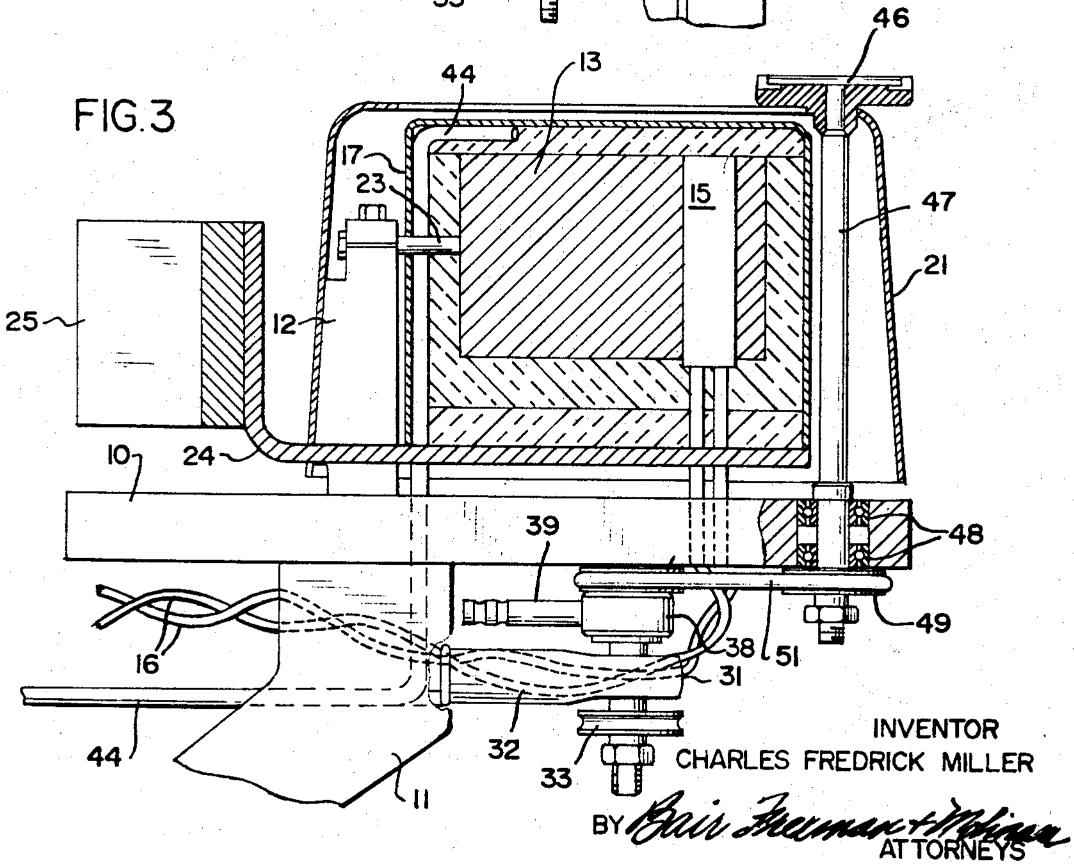
FIGURE 3 is a section on the broken line 3—3 of FIGURE 1.

It is desirable in many types of bonding operations to provide an inert gas atmosphere at the work area to prevent oxidation of the parts due to the elevated temperature thereof. For this purpose a conduit 44 which may lead from a source of inert gas such as hydrogen, extends upwardly through the supporting plate 10 and into and through the insulating casing 17, as best seen in FIGURE 3. At its upper end the conduit extends horizontally through the insulation above the block 13 to discharge orifice 45 which lies immediately above and at one side of the supporting means 34, as best seen in FIGURES 1 and 2. During a bonding operation, inert gas may be forced through the conduit 44 to discharge from the orifice 45 horizontally over the supporting means to envelope the work area and to prevent oxidation of any of the parts during a bonding operation.

To facilitate use of the apparatus for die bonding, dice cup 46 is mounted adjacent to and at one side of the work area, as best seen in FIGURES 1 and 3. The dice cup itself may be of conventional construction with a flat upper surface surrounded by an upstanding rim to receive a plurality of wafers or dice and to hold them in position to be picked up by a needle as is conventional in die bonding. According to the present invention, the dice cup is mounted on a vertical shaft 47 which is rotatably supported in bearings 48 in the supporting plate and which extends within and projects through the upper end of the radiation shield 21. In order to turn the dice cup so that wafers or dice thereon will be properly oriented to be picked up by the needle, the shaft 47 carries a sheave or pulley 49 which is connected by a belt 51 to a similar pulley or sheave 52 secured to the shaft 28. By this means, when the shaft 28 is turned the dice cup will also be turned simultaneously. Due to this feature the dice cup and the head can be controlled with respect to orientation by a single control member so that the operator can, without changing his hand from one knob to another, pick up a wafer or die in a desired orientation and can properly orient it with respect to the header on which it is to be mounted. Due to the fact that the head can be rotated properly to orient a header or similar work piece carried thereby, the necessity for correct orientation of the headers or work pieces when placing them in the supporting means therefor is eliminated. The apparatus of the present invention therefore adapts itself admirably to hand operations and is capable of a wide flexibility with respect to the type and character of work pieces to be worked upon as well as accommodating itself to either die bonding or wire bonding operations.

While one embodiment of the invention has been shown and described in detail, it will be understood that this is illustrative only and is not to be taken as a definition of the scope of the invention, reference being had for this purpose to the appended claims.

What is claimed is:

1. A work station for wire and die bonding apparatus comprising a supporting plate, a block secured to the plate formed with a vertical opening therethrough, means for heating the block, a head rotatably mounted in the opening to be heated by the block, means on the upper end of the head to support a semiconductor part thereon, means supporting the head on the plate for rotation of the head about a vertical axis, and means to rotate the head.

2. The work station of claim 1 in which the block is inclosed in an insulating casing and a radiation shield spaced from the casing, the casing and shield having openings in their tops registering with the supporting means.

3. The work station of claim 1 in which a heat transfer plate underlies the block and is spaced from the supporting plate to block transfer of heat from the block to the supporting plate.

4. The work station of claim 1 in which the head is formed with a passage therethrough communicating with a port in the top of the supporting means and adapted to be connected to a source of vacuum to hold a semi-conductor part on the supporting means.

5. The work station of claim 1 including means defining a passage for inert gas extending up through the supporting plate and terminating in a discharge opening above and at one side of the supporting means.

6. The work station of claim 2 in which a conduit for inert gas is formed in the insulating casing and terminates in a horizontally directed discharge opening above and at one side of the supporting means.

7. The work station of claim 1 in which the interior of the opening in the block and the exterior of the head are formed with interfitting fins to increase the transfer of heat therebetween.

8. The work station of claim 1 including a dice cup mounted on the supporting plate at one side of the block for roation about a vertical axis, and means for rotating the dice cup.

9. The work station of claim 8 in which the dice cup and the head are drivably connected for simultaneous rotation.

10. The work station of claim 1 in which the block is mounted in spaced relation to the supporting plate and is inclosed in an insulating casing and a radiation shield spaced from the casing, a heat transfer plate lies between the casing and radiation shield and the supporting plate in spaced relation to the supporting plate, the head is formed with a passage communicating with a port in the top of the supporting means, and the insulating casing is formed with a passage adapted to communicate with a source of inert gas and terminating in a horizontally directed discharge opening above and at one side of the supporting means.

References Cited

UNITED STATES PATENTS

| | | | |
|---|---|---|---|
| 3,050,617 | 8/1968 | Lasch | 219—85 |
| 3,179,785 | 4/1965 | Belardi et al. | 219—85 |
| 3,197,608 | 7/1965 | Ingraham | 219—85 |
| 3,284,607 | 11/1966 | Wernz et al. | 219—85 |

RICHARD H. EANES, Jr., *Primary Examiner.*